(12) United States Patent
Allan et al.

(10) Patent No.: US 8,369,330 B2
(45) Date of Patent: Feb. 5, 2013

(54) PROVIDER BACKBONE BRIDGING—PROVIDER BACKBONE TRANSPORT INTERNETWORKING

(75) Inventors: David Allan, Ottawa (CA); Nigel Bragg, Weston Colville (GB); Marc Holness, Ottawa (CA); Robert Friskney, Harlow (GB); Simon Parry, Harlow (GB)

(73) Assignee: Rockstar Consortium LP, Richardson, TX (US)

( * ) Notice: Subject to any disclaimer, the term of this patent is extended or adjusted under 35 U.S.C. 154(b) by 1231 days.

(21) Appl. No.: 11/479,694

(22) Filed: Jun. 30, 2006

(65) Prior Publication Data
US 2007/0076719 A1 Apr. 5, 2007

Related U.S. Application Data

(60) Provisional application No. 60/723,478, filed on Oct. 5, 2005.

(51) Int. Cl.
*H04L 12/28* (2006.01)
(52) U.S. Cl. ............. 370/392; 370/395.5; 370/401
(58) Field of Classification Search ............. 370/392
See application file for complete search history.

(56) References Cited

U.S. PATENT DOCUMENTS

| | | | |
|---|---|---|---|
| 2004/0037279 A1* | 2/2004 | Zelig et al. ............. | 370/390 |
| 2004/0042454 A1 | 3/2004 | Zabihi et al. | |
| 2004/0081171 A1 | 4/2004 | Finn | |
| 2005/0220096 A1* | 10/2005 | Friskney et al. ......... | 370/389 |
| 2006/0029032 A1 | 2/2006 | Allan et al. | |

FOREIGN PATENT DOCUMENTS
EP 1538786 A2 6/2005

OTHER PUBLICATIONS

Bottorff et al. ("Provider Backbone Bridging Networks", Seminar on Metro Ethernet Technologies, Broadband Networking, Technology Department, Universitat Pompeu Fevre, Oct. 15, 2004).*
ITU-T G.8031 (ITU-T G.8031/Y.1342, "Ethernet Protection Switching", Jun. 2006).*
Lasserre et al. ("Virtual Private LAN Services over MPLS", Jul. 1, 2005).*
Bottorff P. et al.: "Provider Backbone Bridging Networks", Seminar on Metro Ethernet Technologies, Broadband Networking, Technology Department, Universitat Pompeu Fabra. Oct. 15, 2004. pp. 1-72. URL: http://www.tecn.upf.es/~_dsala/events/MEFoct04.html Retrieved from the Internet on Nov. 7, 2006.
Chirurvolu G. et al.: "Issues and approaches on extending Ethernet beyond LANs" Ethernet Transport over Wide Area Networks. Communications Magazine, IEEE, vol. 42, Issue 3, Mar. 2004, pp. 80-86.
David Allan and Nigel Bragg, Nortel, Alan McGuire and Andy Reid, BT, "Ethernet as Carrier Transport Infrastructure", IEEE Communications Magazine, Feb. 2006, pp. 134-140.

(Continued)

*Primary Examiner* — John Blanton
(74) *Attorney, Agent, or Firm* — Pearne & Gordon LLP

(57) ABSTRACT

An Ethernet virtual switched sub-network (VSS) is implemented as a virtual hub and spoke architecture overlaid on hub and spoke connectivity built of a combination of Provider Backbone Transport (spokes) and a provider backbone bridged sub-network (hub). Multiple VSS instances are multiplexed over top of the PBT/PBB infrastructure. A loop free resilient Ethernet carrier network is provided by interconnecting Provider Edge nodes through access sub-networks to Provider Tandems to form Provider Backbone Transports spokes with a distributed switch architecture of the Provider Backbone Bridged hub sub-network. Provider Backbone transport protection groups may be formed from the Provider Edge to diversely homed Provider Tandems by defining working and protection trunks through the access sub-network. The Provider Backbone Transport trunks are Media Access Control (MAC) addressable by the associated Provider Edge address or by a unique address associated with the protection group in the Provider Backbone Bridged network domain.

34 Claims, 10 Drawing Sheets

OTHER PUBLICATIONS

"Adding Scale, QoS and Operational Simplicity to Ethernet", Nortel Networks, Date: At least as early as Jun. 29, 2006, 8 Pages.
Hamid Ould-Brahim Frank Neil Frank Palermo Vasile Radoaca Nortel Networks Juan Manuel Ramos-Gurrion Paul Lebel Bell Canada: "Service Requirements for Ethernet based L2VPNs; draft-ouldbrahim-ethernet-12vpn-requirements-00.txt", IETF Standard-Working-Draft, Internet Engineering Task Force, IETF, CH, Jul. 1, 2001, XP015033591, ISSN: 0000-0004.

* cited by examiner

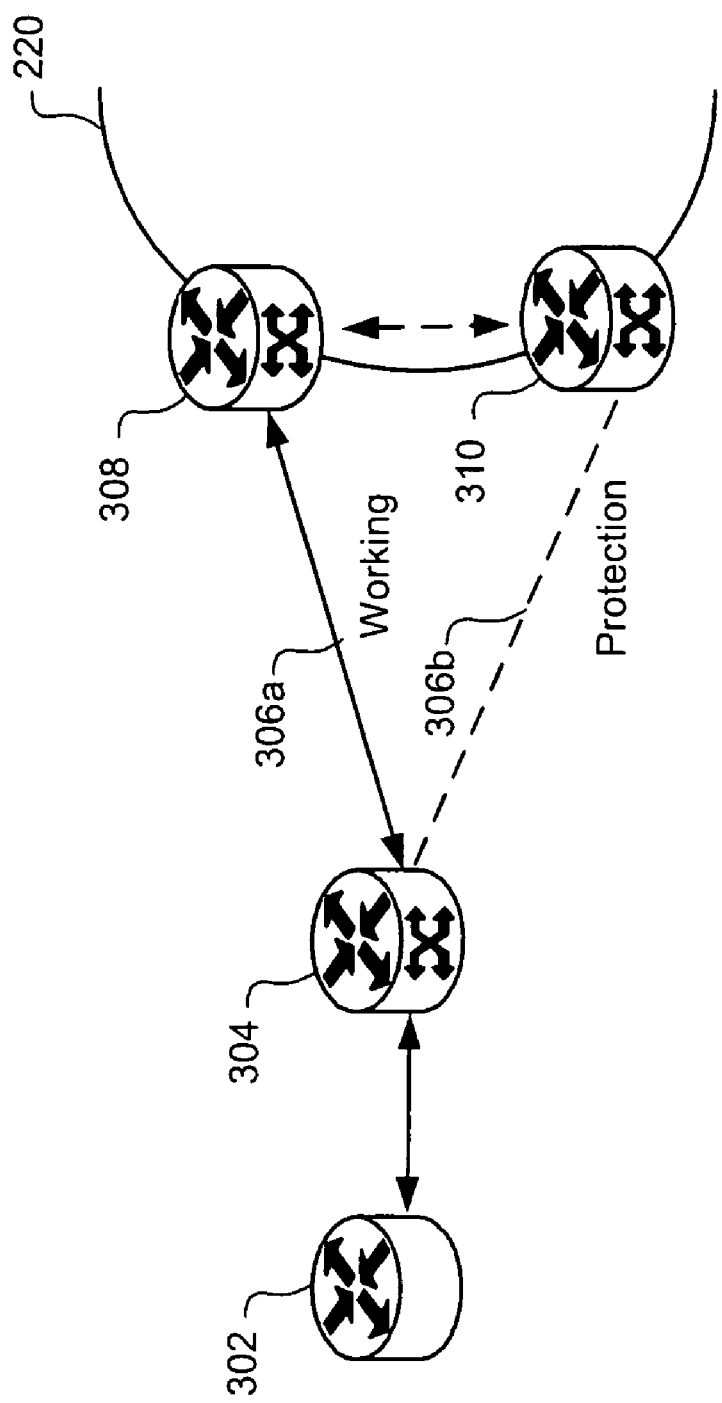

PROVIDER BACKBONE BRIDGING—PROVIDER BACKBONE TRANSPORT INTERNETWORKING

CROSS-REFERENCE TO RELATED APPLICATIONS

This application claims benefit under 35 U.S.C. 119(e) from U.S. Provisional Patent Application Ser. No. 60/723,478, entitled PROTECTION SWITCHED ETHERNET LAN SEGMENT, which was filed on Oct. 5, 2005.

TECHNICAL FIELD

The present invention relates to packet-switched network architectures in particular to hybrid Ethernet provider backbone transport and provider backbone bridge interconnection.

BACKGROUND

Packet-switched networks are being deployed by telecommunications providers to service the growing demand for data services in the corporate and consumer markets. The architecture of packet-switched networks such as Ethernet based networks is easy to deploy in smaller networks but not easily scalable in larger metropolitan area networks (MAN) or wide area networks (WAN) or provide the standards of service associated with service providers. Therefore Ethernet networking has traditionally been limited to Local Area Networks (LAN) deployments.

Use of Ethernet switches in carrier's networks has the advantages of interoperability (mappings between Ethernet and other frame/packet/cell data structures such as IP and ATM are well known) and economy (Ethernet switches are relatively inexpensive compared to IP routers, for example). However, the behaviour of conventional switched Ethernet networks is incompatible with carriers' requirements for providing guaranteed services to customers and provide the ability to scale the network to a growing customer base. Carriers need networks to be meshed for load balancing and resiliency—i.e. there must be multiple paths across it. In addition any network must provide the ability to perform traffic engineering, i.e. the ability of the network operator to control the provisioning of explicitly routed variable bandwidth connections (or tunnels) through which traffic may be directed and to provide the ability to easily add network capacity as required.

Conventional Ethernet networking which was developed for the local area network (LAN) must be inexpensive and simply connected, i.e. there must be one and only one path between each and every node of the network. As a consequence, Ethernet does not have support for network-wide load balancing, suffer from resiliency problems, cannot support traffic engineering, and cannot be easily scaled for growth in larger network architectures.

To facilitate the deployment of Ethernet technologies standards have been evolving to address some of the growth and internetworking issues. In particular, standards such as 802.1ad, entitled Provider Bridges and 802.1ah entitled Provider Backbone Bridges have been developed by the Institute of Electrical and Electronics Engineers (IEEE) to help address some of the internetworking issues.

802.1ad defines an architecture and bridge protocols compatible and interoperable with existing Bridged LAN protocols and equipment and is also known as QinQ with VLAN stacking. Separate instances of MAC services to multiple independent users of a bridged LAN in a manner that does not require cooperation among the users is defined. 802.1ad requires a minimum of cooperation between the users and the provider of the MAC service and is referred to a Provider Bridge (PB). Virtual LAN identifiers (VID) are added to the Ethernet header (which is also known as stacking) to offer the equivalent of separate LAN segments, bridged or virtual bridged LANs, to a number of users, over the service provider's bridged network.

802.1ah defines an architecture and bridge protocols compatible and interoperable with Provider Bridged Network protocols and equipment allowing interconnection of multiple Provider Bridged Networks, to allow scaling and to support management including simple network management protocol (SNMP). This standard is also referred to as Provider Backbone Bridging (PBB) or MACinMAC addressing as source and destination Media Access Control (MAC) addresses are added to the Ethernet header to define sources and destination backbone MAC addresses. Each IEEE 802.1ah level encapsulates frames with a new MAC address and with a new service identifier (I-SID). Each IEEE 802.1ah nesting level summarizes the MAC addresses of the lower level with a backbone MAC address. The higher level 802.1ah bridges forward on summarized addresses allowing indefinite scaling without MAC lookup table explosion.

Other proposed architectural solutions for scaling Ethernet networks such as IEEE 802.Q entitled Virtual LANs have been developed. 802.1Q proposes that Local Area Networks (LANs) of all types may be connected together with Media Access Control (MAC) Bridges by defined a VID. This solution only provides 4094 services per VSI. Alternate solutions such as Virtual Private LAN Services (VPLS), which provides over a million unique identifiers, (Multi Protocol Label Switching (MPLS) Labels) but has resiliency issues, and requires manual coordination of flushing of MAC tables when an error occurs.

Accordingly, systems and methods that enable scalable and reliable carrier grade Ethernet network to be deployed in the carrier backbone remains highly desirable.

SUMMARY OF THE INVENTION

The present invention provides a hub and spoke network architecture connecting Provider Edge (PE) nodes by Provider Backbone Transport (PBT) trunks to a Provider Backbone Bridge (PBB) loop free hub interconnect (referred to as the PBB sub-network) for a scalable and reliable network architecture-in a carrier network. The purpose of the connectivity construct is to implement one or more Ethernet virtual switched sub-networks (VSSs) each serving an arbitrary number of customer sites.

A VSS is implemented as a virtual hub and spoke architecture overlaid on hub and spoke connectivity built of a combination of PBT (spokes) and a PBB sub-network (hub) Multiple VSS instances are multiplexed over top of the PBT/PBB infrastructure.

Traffic from the Customer Edge (CE) enters the network through the PE nodes. PBT trunks are defined by a connection mapping through the intermediary nodes identified by the destination address and a Virtual Local Area Network (VLAN) identifier. The PBB provides a core distributed switching fabric—the hub—with the PBT connections providing the spokes extending from the hub. The PBB sub-network is implemented as one or more Provider Tandem (PT) nodes utilizing PBB interconnect. The PBT extends the geographic reach of PBB sub-network allowing for capacity expansion through the addition of multiple PBT trunks forming spokes to the edge customer networks. The PBT also provides reliable access to the PBB hub by enabling protection groups formed by multiple trunks from the PE to the PBB edge. The PBB hub allows for expansion of capacity via the addition of PT nodes to the PBB sub-network.

Multiple customer sites in distinct switched sub-networks may be served by a PE. In the situation where multiple customer sites in a common VSS are homed on a single PE, it may also implement a VSI such that the ensuing virtual network appears as a switching hierarchy.

Multiple switched sub-networks may be served by a PT where the individual switched sub-networks are each served by a virtual switch instance (VSI) hosted on the PT. Each PT will implement a number of Virtual Switch Instances (VSIs).

PBT connectivity permits the multiplexing of customer traffic over common trunk connectivity between a PE and a PT, so that when there are common virtual switched sub-networks between the PT and a given PE, a single PBT protection group can provide the requisite connectivity. The association of traffic with a specific virtual switched sub-network is performed by I-SID tagging of the traffic at the PE.

The inter-working between the PBT aggregation network and the PBB based tandem switching function utilizes MAC addressing of the PBT protection groups. In this way the learning of customer MAC to provider MAC information by other switches in the PBB cloud is independent of the actual fault state of the PBT protection groups, and if a failure in the PBT network causes a protection switch, simply associating the PT to which the currently working path is connected with the MAC address of the protection group will correctly redirect all customer traffic switched in the PBB hub to the correct PT. This can be achieved by having the PT originate a transaction local to the PBB hub with the protection group MAC address as source when the protection group switches to that particular PT as the trunk end point. Traffic can therefore be seamlessly switched between protection groups without requiring tables mapping customer MAC addresses to provider addresses to be flushed and subsequently re-learned in the PBB sub-network. The MAC addressing of protection groups means the addressing of customer access points is effectively invariant in the PBB cloud.

Thus, an aspect of the present invention provides an Ethernet services network. The services network is formed by a distributed switching fabric sub-network have a plurality of access sub-networks interconnected thereto. A virtual hub is overlaid on to the distributed switching fabric and a plurality of virtual spokes overlaid on to the plurality of access sub-networks. A plurality of virtual switched sub-networks mapped through the virtual spokes and virtual hub.

A further aspect of the present invention provides a method of providing Ethernet services in an packet-based network. A packet is forwarded through a distributed switching fabric sub-network to a provider tandem in dependence of a network address associated with a path to an interconnected access sub-network. The packet is then forwarded from the provider tandem to a provider edge node via the path through a plurality of nodes of the access sub-network to a destination provide edge based upon the network address of the provider edge and a path identifier.

Yet a further aspect of the present invention provides a method of configuring Ethernet services in an packet-based network. A primary path is configured through a first access sub-network from a provider edge node to a primary provider tandem node wherein the path is defined by a destination address and a path identifier. The first provider tandem node is configured to route packets on to a distributed switching fabric sub-network.

Still yet a further aspect of the present invention provides a system for packet-based networking. A provider edge node connected to an access sub-network is provided. A provider tandem node connects to the provider edge node by the access sub-network and a distributed switching fabric sub-network interconnects with the provider tandem node. A communication path from the provider edge node through the access sub-network to the provider tandem node is provided in dependence of a combination of an network address of the provider tandem node and an identifier associated with the provider trunk.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Further features and advantages of the present invention will become apparent from the following detailed description, taken in combination with the appended drawings, in which:

FIG. 3 shows a PBT protection group internetworking at the PBB edge according to the present invention;

It will be noted that throughout the appended drawings, like features are identified by like reference numerals.

DETAILED DESCRIPTION

Figure 1:
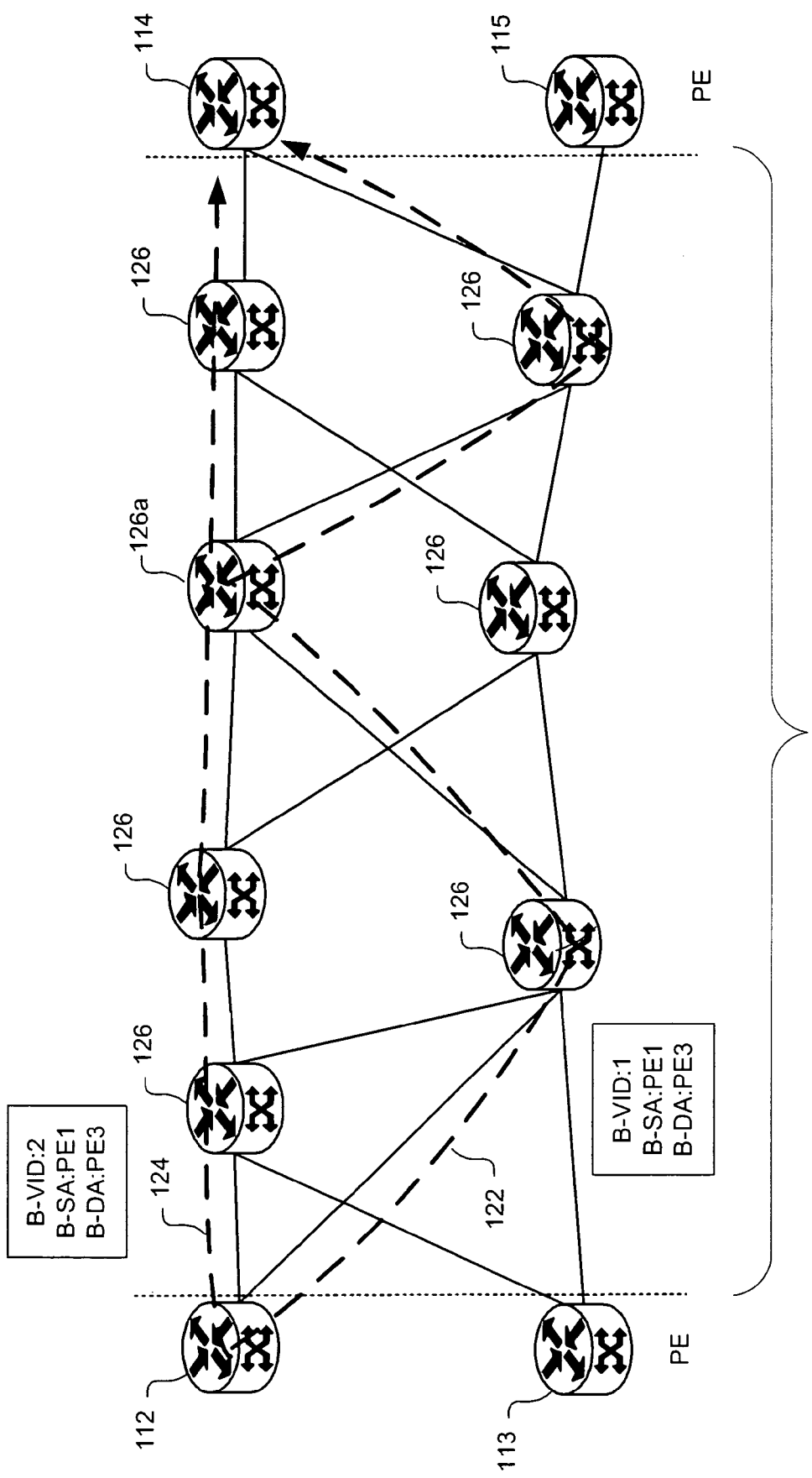
FIG. 1 shows how connections can be established through a network utilizing Provider Backbone Transport (PBT) according to the present invention.

Embodiments of the present invention are described below, by way of example only, with reference to FIGS. 1-9.

The present invention provides system and methods for creating very scalable and resilient hub and spoke LAN services by interconnecting access sub-networks such as Provider Backbone Transport (PBT) spokes to a distributed switching fabric sub-network such as a Provider Backbone Bridged (PBB) sub-network hub. The PBB comprises one or more customer aware switches interconnected with some form of bridged loop free interconnect (e.g. Spanning Tree Protocol (STP), Resilient Packet Ring (RPR), etc.). The distributed switching fabric sub-network may alternatively be implemented by a number of networking technologies. The sub-network may be a provider backbone bridged hub compliant with IEEE 802.1ah, a resilient packet ring, Multi-Protocol Label Switching (MPLS) virtual private network configuration (VPLS) or other virtualized layer 2 networks. The switches in the central hub perform what is normally considered to be a tandem switching function and therefore the nodes are termed Provider Tandems (PTs).

The Customer Edge (CE) connects to the carrier network via the provider edge (PE) nodes. The PE nodes are connected to PT switches by the PBT trunks. The PBT trunks provide defined connections through the nodes of the connecting network. Traffic engineering in frame-based networks using PBT is described in pending US Application No. 2005/020096A1, entitled TRAFFIC ENGINEERING IN FRAME-BASED CARRIER NETWORKS, commonly assigned and hereby incorporated by reference.

The hub and spoke architecture enables one or more Ethernet virtual switched sub-networks (VSSs) to be implemented, each serving an arbitrary number of customer sites. A VSS is implemented as a virtual hub and spoke architecture overlaid on hub and spoke connectivity built of a combination of PBT (spokes) and PBB (hub). Multiple VSS instances are multiplexed over top of the PBT/PBB infrastructure.

The PBB hub maintains multiple customer specific virtual switch instances (VSIs). PBT, as a front end trunking mechanism, permits "grooming" of the backhaul to minimize the number of instances of VSI required per each customer network supported. The minimum being typically two, a primary and a hot standby. The reason for this being that replicating customer switching tables unnecessarily diminishes the scalability of the overall solution.

Multiple customer instances are multiplexed or trunked via PBT, between the PE and the PTs of the PBB sub-network when some portion of the set of customers attached at a given PE correspond to the set of customers supported by the specific PBT termination at the PBB sub-network. It may arise that more than one PBT protection group connects a PE to the PBB sub-network when the required set of customer PBB VSIs are not all co-located with a single trunk termination. In addition, PBT connectivity permits the multiplexing of customer traffic over common trunk connectivity between a PE and a PT, so that when there are common virtual switched sub-networks between the PT and a given PE, a single PBT protection group can provide the requisite connectivity. The association of traffic with a specific virtual switched sub-network is performed by I-SID tagging of the traffic at the PE.

The working and hot standby VSIs are connected via a common broadcast domain local to the PBB hub (implemented as a PBB VLAN). For scalability reasons the common broadcast domain may be shared by multiple customer service instances. For example, the scenario whereby multiple VSIs are implemented on a single processor, and the hot standby VSIs implemented on a corresponding second processor, a common broadcast domain to the pair of processors would be used.

For scalability reasons there may be more than one working/hot standby VSI pair associated with a given VSS in a given PBB hub. (For example, if the maximum number of trunk terminations a single VSI implementation can support is exceeded and additional capacity is required). In this scenario the common broadcast domain (VLAN) is simply extended to the additional VSIs.

Loop free resiliency in the PBT network connecting the PEs to the PTs is achieved by the use of protection groups (1:1 protection switched trunks diversely homed on the PBB hub) and some form of coordination protocol (an example of which being International Telecommunications Union (ITU) recommendation G.8031 entitled Ethernet Protection Switching) such that the PE and the PBB hub both agree on which of the paths is the current traffic bearing path and that there is only one path active at any given time. Where the protection group is diversely homed (single PE connected to diverse PTs), the PE (being the node in common) becomes the arbiter of the trunk state. Traffic to and from the PE transits through the working PT in to the PBB associated with the working PBT.

Protection switching coordination is typically implemented such that the PEs and PTs both agree on who is the primary VSI and who is the hot standby VSI for the set of customer service instances transported between the PEs and PTs over a given PBT protection group. This minimizes the amount of bandwidth required in the PBB domain. A PT may implement a number of VSIs, and every trunk to the PT backhauls traffic from PEs that have any customer facing ports corresponding to the VSIs on the PT. If the PT fails, then the trunk protection switch will move the customers to the corresponding hot standby. Therefore proper fate sharing between the PBT connectivity and the PBB switching is achieved, and the cardinality of failure is aligned. When a PT fails, the trunks to that PT switch to the hot standby, for the set of affected VSIs. The PBB sub-network ensures connectivity between those customer sites homed on the primary VSI and those homed on the hot standby is maintained. In the scenario whereby the primary VSI fails, all PBT trunks associated with the VSI will switch to the hot standby.

In a normal fault free scenario, the customer MAC information in the hot-standby(s) is populated via reception of unknown traffic flooded in the local broadcast domain by the primary VSIs(s). When the primary and hot-standby are directly connected to PE sites, both the primary and hot-standby are synchronized by mutual exchange of unknown traffic. Normally entries learned in this way are aged out to prune the required amount of state information in a mesh network consisting of many bridges. However, the utility of utilizing age out diminishes greatly in such a constrained topology, therefore timers may be either made very long or disabled entirely.

PBB nominally operates as a distributed switch whereby customer facing ports may be MAC addressed in the PBB space and a 802.1ah PBB edge function uses well understood MAC learning procedures to associate customer MAC (C-MAC) addresses with provider backbone MAC (B-MAC) addresses. The inter-working between the PBT aggregation network and the PBB based tandem switching function utilizes this property by MAC addressing the PBT protection groups as they logically telescope ports out to the PE. In this way the learning of customer MAC to provider MAC information by other switches in the PBB sub-network cloud is independent of the actual fault state of the PBT protection group, and if a node or trunk failure in the PBT access sub-network causes a protection switch, simply associating the PT to which the currently working path is connected with the B-MAC address of the protection group will correctly re-direct all customer traffic switched in the PBB hub to the correct PT. This can be achieved by having the PT originate a transaction local to the PBB hub with the protection group MAC address as source when the protection group switches to that particular PT as the trunk end point. The technique of MAC addressing a protection switched entity in the PBB sub-network will also work with alternate forms of network protection switching provided by for example ATM I.630 protection switching or, SONET/SDH etc.

It will be apparent to the reader skilled in the art that the central loop-free interconnect may be over, for some of or for all of its extent, a logical partition of links used for other traffic. This may be done by partitioning the VLAN space between e.g. PBB (including PT loop-free interconnect) and PBT partitions. In an Ethernet or similar environment the operator may wish to take steps to limit the interference of the PT-interconnect traffic with other traffic in the same or a different partitions. Some method in which this may be done are by running the PT-interconnect traffic on a lower-priority 802.1p/802.1ad marking than the other traffic. Edge policing the aggregate bandwidth that each PT will inject onto the PT-interconnect in respect of either a) PT-interconnect traffic, b) any given particular I-SID (i.e. VPN instance) and particularly if something like RPR is utilized c) PT-interconnect traffic in a particular direction (east/west) and d) any given particular I-SID and particularly if something like RPR is utilized per-direction. This functionality may optionally be incorporated into a connection-admission-control control plane or a management system.

FIG. 1 shows the operation of PBT as described in pending US Application No. 2005/020096A1. The combination of VLAN ID (VID) and destination address enables differentiation between connections across a carrier network 130. In this example the carrier network comprises 4 provider edge Ethernet switches 112, 113, 114, 115 (corresponding to PE1, PE2, PE3, PE4), further Ethernet switches in the network core 130 including core Ethernet switches 126, and communications links between the core and edge switches. Nodes at the provider edge (PE) establish connections through the network 130.

In a mesh network as shown, traffic may take a number of routes from the ingress point to the egress point. For example a customer sending traffic from PE1 112 to PE3 114 may take a different path through the network depending on network conditions. Each path may provide different QoS. In addition, not all packets in the communication session may take the same path. In this example, by using PBT, all traffic from PE1 112 to PE3 114 would transit by a defined network path through the network based upon the VID selected. The PBT connections 122 and 124 both have the same source address (edge Ethernet switch 112-PE1) and destination address (edge Ethernet switch 114-PE3). However, the routes that connections 122 and 124 traverse are different.

In particular, it can be seen that at core Ethernet switch 126a, connections 122 and 124 converge and then immediately diverge. Despite the common destination address, switches 126a is able to differentiate frames belonging to connection 122 from frames belonging to connection 124 (and to forward them accordingly) on the basis of their different VLAN ID (VID). Thus, data traffic in connection 124 has the VID 2, for example, whereas data traffic in connection 122 has the VID 1.

By utilizing PBT, as described previously, a means for engineering routes through the carrier network is provided. By utilizing a combination of a destination MAC and VLAN ID to direct the forwarding of traffic through the network, PBT allows a specific path to be mapped ensuring consistency in traffic flow and providing a means of QoS.

Figure 2:
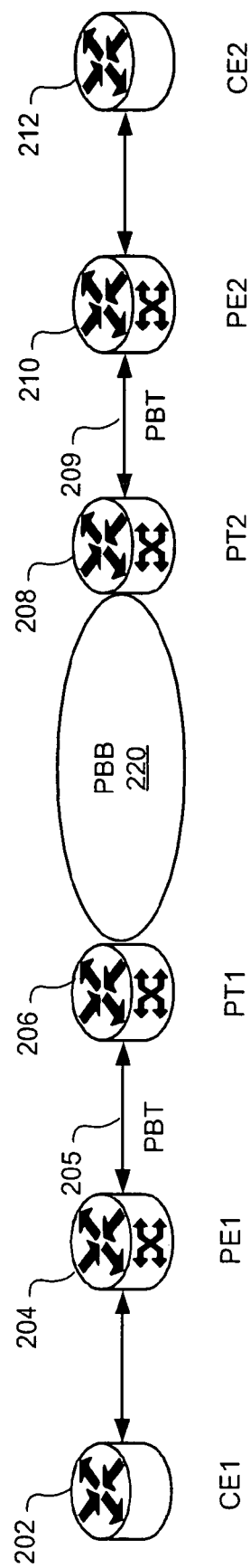
FIG. 2 shows a scalable network utilizing provider backbone transport (PBT) to extend the Provider Backbone Bridged (PBB) sub-network according to the present invention.

FIG. 2 shows a simplified view of a service provider network employing PBT spokes 205 and 209 connected to a PBB hub sub-network 220 configuration to provide a network architecture that is scalable and expandable in accordance with an embodiment of the present invention. Customer Edge (CE) nodes, CE1 202 and CE2 212, are connected to Provider Edge (PE) nodes, PE1 204 and PE2 210 respectively. Each PE, connects to a PT node which interconnects with the PBB sub-network 220. The PBB sub-network 220 comprises one or more customer aware switches interconnected with some form of bridged loop free interconnect (e.g. Spanning Tree Protocol (STP), Resilient Packet Ring (RPR), etc.). It should be understood that the PBB sub-network may be any type of network architecture such as a mesh or ring. For illustrative purposes, in the figures a ring architecture is shown.

In contrast to the example described in FIG. 1, the PBT trunks are between PE and PT as opposed to two PE end nodes. The PBT spokes, PE1 204 to PT1 206 and PE2 210 to PT2 208, provide access to the PBB hub 330. The PBT trunks provide defined connections through the nodes of the connecting access sub-network. PBT, as a front end trunking mechanism, permits "grooming" of the backhaul to minimize the number of instances of VSI required at the PT per each customer network supported. Each customer service instance is denoted by an Service Identifier (I-SID) used for mapping to the associated VSS. Each is backhauled to VSIs homed to PTs on the PBB. The I-SID carried on the PBT trunks identify which customer traffic belongs to which VSIs hosted by the PTs.

FIG. 3 shows two PBT paths, 306a and 306b, defined from the PE 304 to the PT 308 and PT 310 for ingress into the PBB sub-network 220. Multiple paths through the access sub-network can be used to provide protection switching for traffic originating from the CE 302 and transiting through PE 304. From PE 304, two paths are shown, 306a and 306b which connect to PT 308 and PT 310 respectively. Path 306a is identified as the working path while path 306b is identified as the protection path. Depending on which path is operational, traffic from CE 302, is received at PE 304 and sent to the active PT 308 or 310, and the associated hosted VSI.

Provisioning of multiple PBT paths facilitates protection switching on the PBT access sub-network spoke. To enable switching between the working and protection PBT paths, a protocol such as for example International Telecommunications Union (ITU) recommendation G.8031 entitled Ethernet Protection Switching, or similar protocols can be utilized for protection events. G.8031 defines protection characteristics, architectures and the automatic protection switching protocols for determining when the PBT route should be changed. When a fault occurs, traffic is directed to the protection path 306b and the associated PT 310 and VSI(s) for continued access to PBB 220 sub-network. The VSI(s) of the associated PT 310 assumes processing of traffic. In this manner the PBT access sub-network provides path protection for access to the core sub-network. As the PBT protection group to the PE 304 is MAC addressed (B-MAC which is defined as the source B-SA or destination B-DA) from the PBB, when failover occurs no tables in the nodes on the PBB 220 sub-network have to be flushed.

It should be evident that the PBT access sub-network may be defined as a mesh network and the PBT path may not simply be a connection between two node points (as shown in FIG. 3) but a more complex path involving multiple node points as shown in FIG. 1.

Figure 4A:
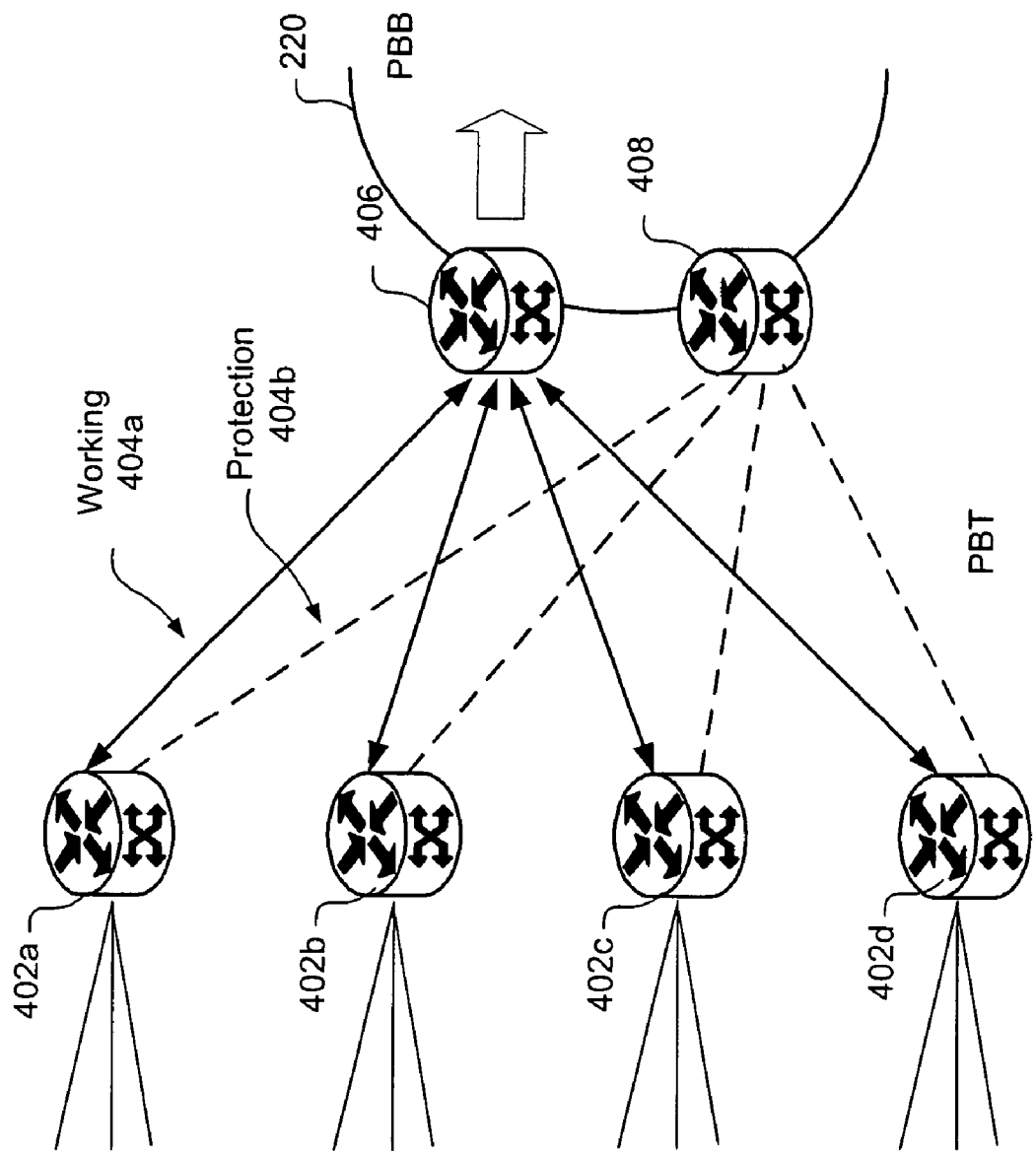
FIGS. 4a & 4b show another embodiment of protection group operation with multiple PE nodes according to the present invention.

FIG. 4 shows an example where multiple PEs (402A, 402B, 402C, 402D) have PBT connections to the PBB 220 sub-network. In this example each PE node is connected to multiple CE nodes (not shown) and has a working path 404a and protection trunk 404b mapped to the same provider transport node, PT1a and PT1b trunks respectively. As shown in FIG. 4a, assuming all of the working trunks 404a are operating, PT 402A provides access for all the CE nodes connected to PE 402A into the PBB 220 sub-network. Each of the PTs, 406 and 408 can host multiple VSIs. In this example, PT 406 hosts a working VSI while PT 408 hosts a hot standby VSI for each of a group of VSSs supported by the PT pair. Normal Ethernet flooding and learning between working and hot standby VSIs over the PBB keeps the hot standby synchronized. The I-SID associated with a specific VSS serves to identify the appropriate VSI in the PT. In this example PT 406 is shown as hosting all of the working PBT trunks while PT 408 hosts only protection PBT trunks. It should be understood that working and protection trunks may be distributed across PTs, a PT may host both working and hot standby VSIs simultaneously. In addition there may be multiple PTs associated with a single PE, each hosting a portion of the overall set of VSSs that the PE participates in.

Figure 4B:
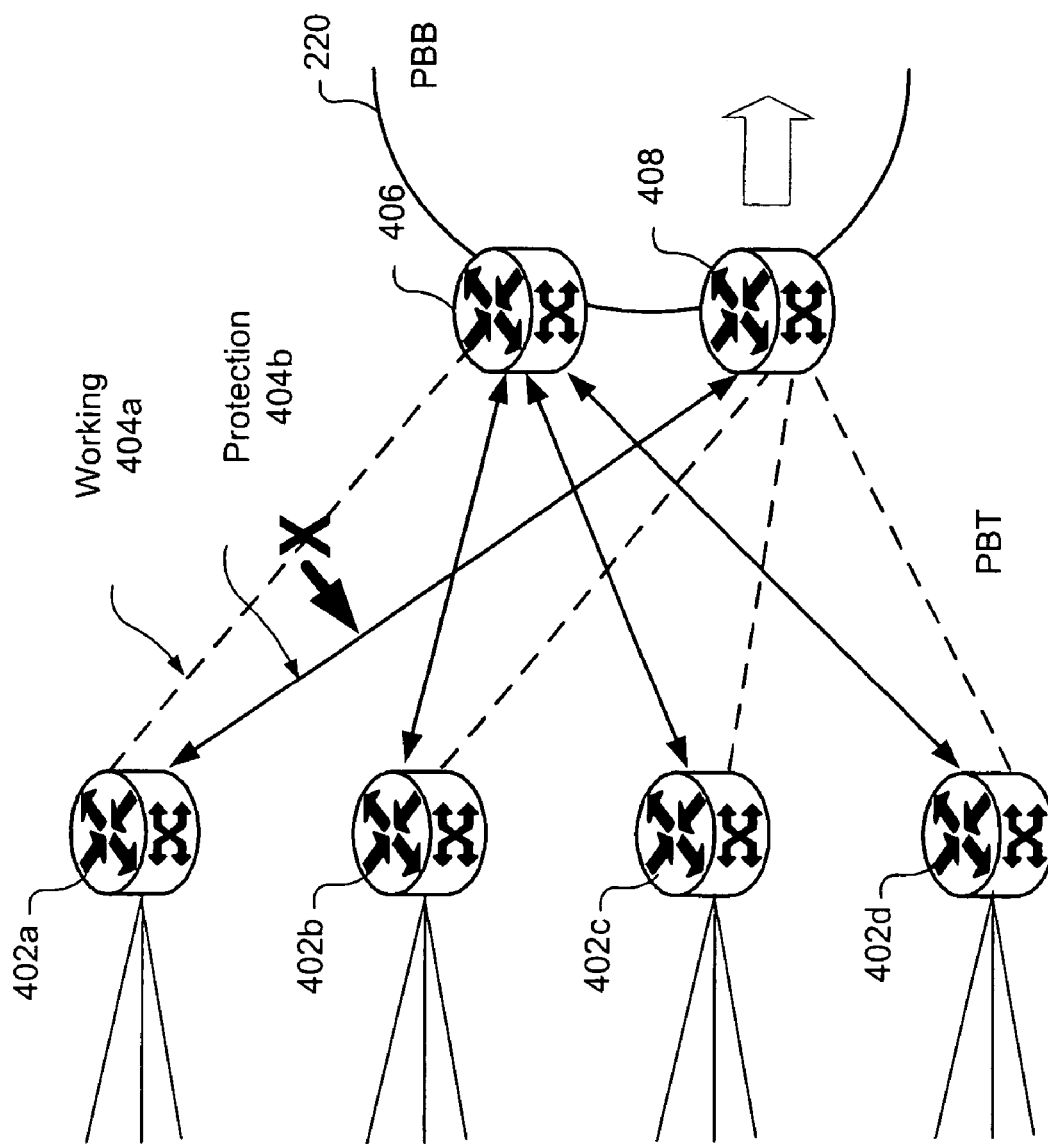

FIG. 4b shows where the working trunk 404a is disabled due to a protection event. Traffic from PE 402A is routed onto the protection PBT trunk 404b. Traffic to and from PE 402A now traverses through PT 408 and onto the PBB network. When the protection event occurs the VSI on 408 takes over traffic processing, the PT 408 sends a broadcast message onto the PBB 220 to signal the event and update the forwarding tables in the PBB sub-network. It should be noted that for Ethernet a multicast group address may also substitute for a broadcast where the implementation of the PBB domain chooses to implement finer granularity of control of information dissemination, for the purposes of the description term broadcast is universally used. As the protection groups are MAC addressed it is only required to broadcast a dummy transaction onto the PBB 220 sub-network which updates forwarding tables to ensure traffic destined to CE 402A from other nodes on the PBB 220 will arrive. There is no relearning or table flushing of customer MAC information required to ensure continued operation. The use of MAC addressing the PBT protection group reduces the failover time considerable limiting traffic disruption if any.

It should also be noted that in an alternative embodiment, traffic from a PE node such as PE 402A may be load balanced between VSIs at the PTs 406 and 408. This is achieved by the provisioning of an additional protection group from the PE node which has an inverse relationship of working and protection paths. Therefore the definition of working and protection paths would be relative to the services carried by the PBT groups and any PBT path failure would result in switching of traffic to the standby VSI and onto the relative protection path. This is facilitated by utilizing I-SID customer identification associated with individual VSIs. This would require additional traffic engineering considerations to ensure that the capacity of any protection path would not be overloaded when assuming traffic from a working path.

Figure 5:
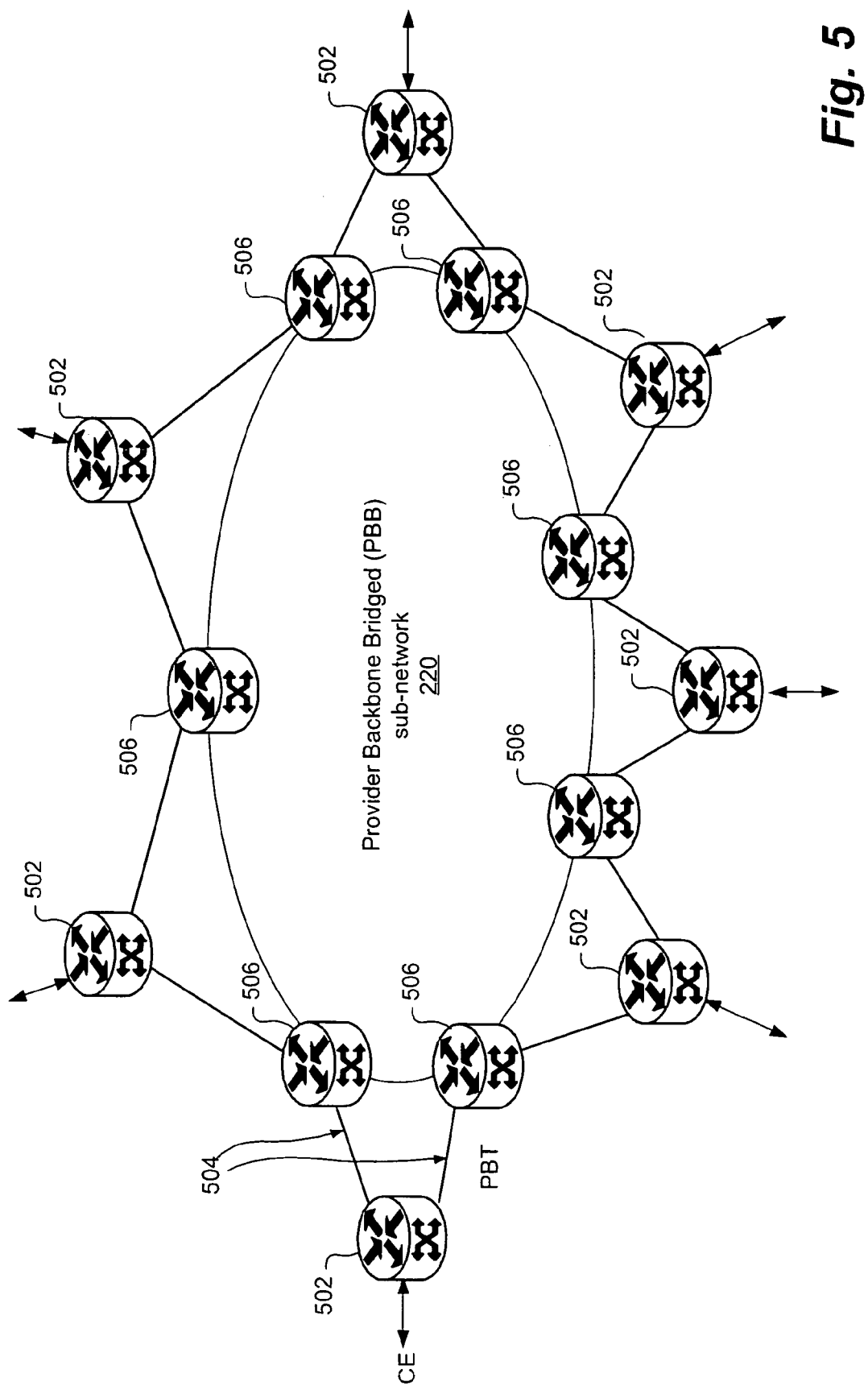
FIG. 5 shows an detailed view of a scalable network utilizing multiple PBT protection groups to extend the PBB sub-network according to the present invention.

FIG. 5 shows a configuration where multiple PBT spokes connect to the PBB 220 hub. In addition, multiple PBT protection paths 504 may be defined between each PE 502 and the PTs 506. In this example, provisioning multiple PBT trunks 504 from each PEs 502 to individual PT's 506 can be utilized to provide redundant paths from the network edge into the PBB hub sub-network 220. For each PE 502, one of the paths into the PBB sub-network would be defined as a working path and the other as the protection path. The working and protection paths from each of the PE 502 are not provisioned to pairs of PTs 506 as shown in FIG. 5. That is each PT 506 and the associated VSIs may not have a matching PT 506 hosting the same VSIs. Each PT 506 will host multiple VSI that are operational or hot-standby depending on the associated trunk state. Therefore each PT 506 may have VSIs in various operational states. This configuration provides the benefit of a mesh hub at the center of the network and spokes which can be expanded and provide traffic engineering. Additional PT 506 nodes can be added to the PBB 220 hub and more PBT 504 spokes extending from it with PT 506 nodes supporting multiple PBT trunks. It should also be understood that multiple protection groups may be associated with each PE 502 into the PBB sub-network 220 depending on the path protection requirements, bandwidth available for each trunk's routing etc..

Figure 6:
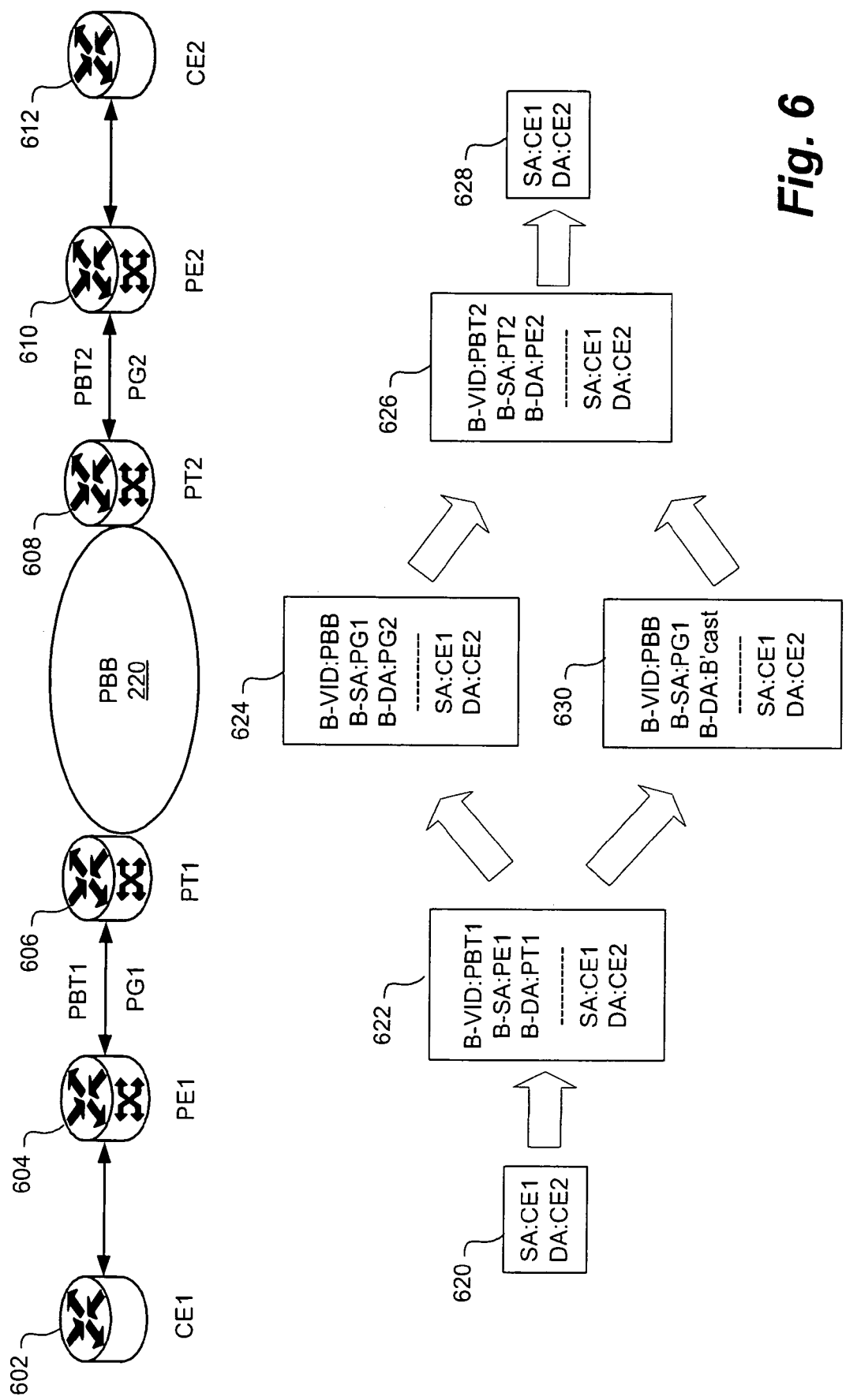
FIG. 6 is an illustrative example of frame header configurations as it transits through a PBT/PBB network according to the present invention.

FIG. 6 shows a simplified PBT spoke and PBB hub network, as shown in FIG. 2, and provides an example of the stacking of the Ethernet packet headers for facilitating forwarding of the data packet through the PBT spoke and PBB hub network. It should be noted that only pertinent portions of the Ethernet header are shown.

The PBB sub-network implementing the hub is presumed to provide connectivity between MAC addressed entities at the periphery of the PEB, typically PBT protection groups. How such connectivity is achieved (be it normal bridging operations or by other means) is assumed but not an explicit part of the invention.

A data packet is sent from CE1 602 to CE2 612. The data header 620, identifies the source address, CE1, and the destination address CE2 as it traverses the link to PE1 604. Additional header information may be provided such as the customer VID (C-VID) and Service VID (S-VID) (not shown) as per 802.1ad stacking or other standard dependent or on the network configuration. The I-SID (not shown) is utilized to associate traffic with a VSS instance at the PTs and allow correct steering of the traffic to the appropriate VSI. In traversing the PBT path between PE1 604 and PT1 606, additional header information is added to the packet header stack as shown in 622. The original source (SA) CE1 602 and destination (DA) CE2 612 header information is maintained however and backbone source (B-SA) PE1 604 and a backbone destination (B-DA) PT1 606 is added in addition to an identifier for the PBT1 route (B-VID). The combination of the backbone destination address and backbone identifier, in this example PT1 and PBT1 VID determines the PBT route through the access sub-network in to the PBB 220 sub-network. In the example PT1 is used, but similarly could be a MAC address selected as common to both the working and protection terminations on distinct PT devices. PE1 610 is not required to maintain destination information beyond the PBT paths into the PBB 220 sub-network and the associated PT nodes.

When the packet arrives at PT1 606, in one case where PT1 606 knows that CE2 612 is accessible via a protection group, PG2 (which in the example the currently active PET trunk in protection group PG2 terminates on PBT2, associated with PE2 610 as the binding has been learned previously). The destination address is a unique MAC address associated with the PET protection group, PG2, associated with PE2. Each VSI of the PT maintains forwarding tables based upon known learning methods of traffic flowing in the PBB 220. The B-DA is changed to PG2, the B-SA is changed to the protection group PG1 associated with the protection group PBT1, and the B-VID is changed to identify the broadcast domain in the PBB sub-network 220 which provides connectivity for the VSS. The packet is then sent on the PBB sub-network 220 and received at PT2 608. The packet is received from the PBB sub-network 220 at PT2 608.

At this stage PT2 608, learns that CE1 is accessible via PG1, which is associated with PE1 604. The B-SA is changed from PT2 608, and B-VID changed to the VID for PBT2 and the packet is forwarded by the PBT2 link to PE2 610. PE2 610 receives the frame, strips the information related to the PBB 220 transport, as shown in 628, and forwards it to CE2 612.

In the case where PT1 606 does not know the destination address of CE2 612 or the associated B-DA, the packet is broadcast onto the PBB sub-network 220 and ultimately will be flooded to all CEs in the particular VSS (or at least all CEs attached to PTs with no knowledge of CE2). As shown in header 630, the B-DA is unknown and set for broadcasting on the PBB 220 sub-network. PT2 608 learns via examination of the flooded packet, of the appropriate port for forwarding through the PBB sub-network 220 to PG1 and CE1 602. Similarly at some future point PT1 will receive a packet from CE2 and which point it will learn that PG2 via PT2 is the correct path to CE2.

Figure 7:
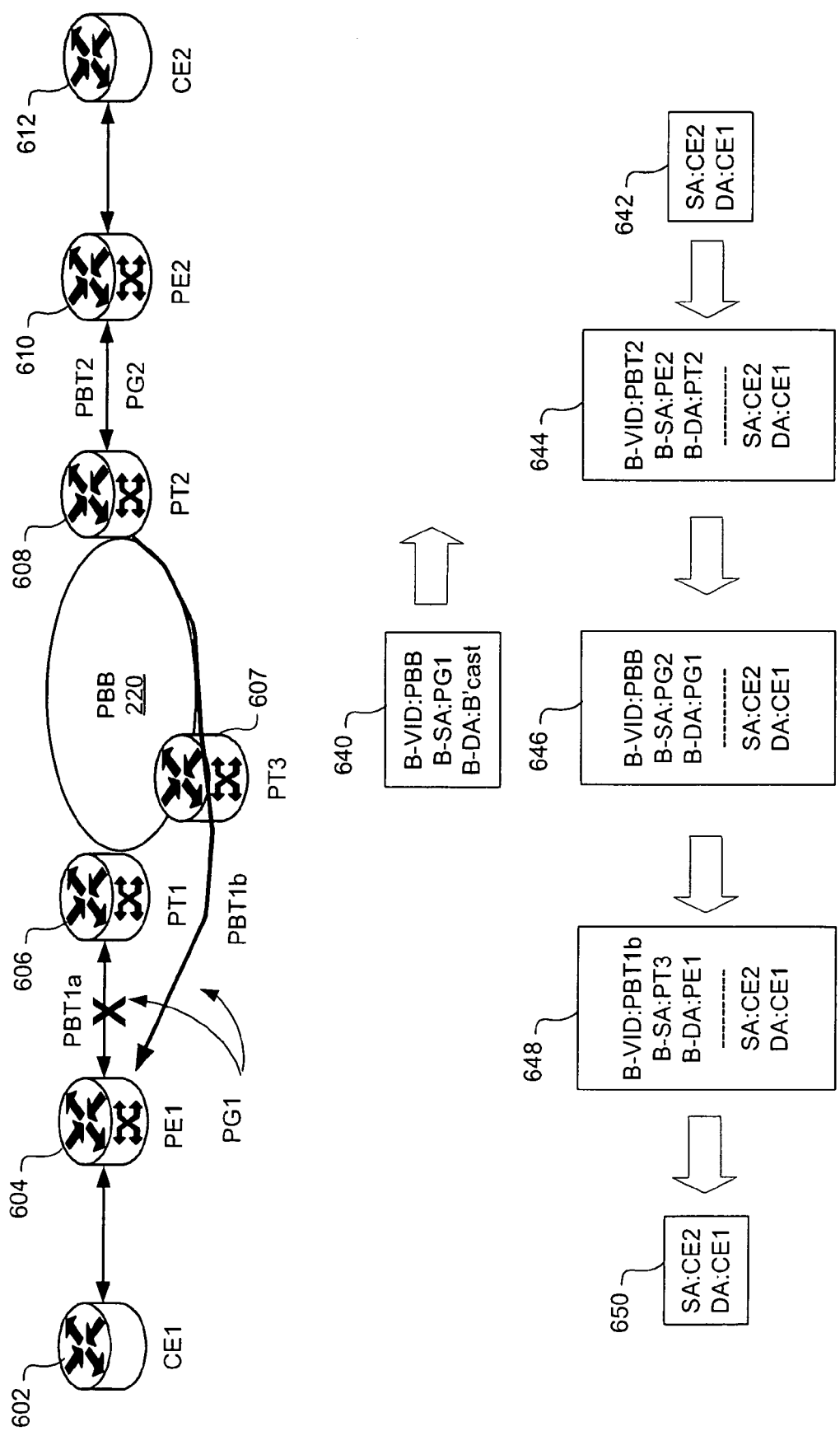
FIG. 7 is an illustrative example of frame header configurations as it transits through a PBT/PBB network when a PBT switchover occurs according to the present invention.

FIG. 7 shows an example in which a packet is transmitted from CE2 612 to CE1 602 and a protection fault occurs. The PBT1 protection group has been expanded to show two paths within the group, PBT1*a* and PBT1*b*. When the fault occurs on PBT1*a* (or failure at PT1), PBT1*b* trunk becomes the working path from PE1 604 to PT3 607 for the protection group PG1. As noted in FIG. 6, the address for the protection group comprising trunks PBT1*a* and PBT1*b* is PG1. When the fault occurs, the VSI of PT3 607 becomes operational for the PBT1*b* trunk to PE1 604. PT3 607 sends a broadcast message, a dummy message, shown in 640, in to the PBB 220 which updates forwarding tables so that traffic for B-DA PG1 will be forwarded via PT3 607. This messaging eliminates the need to manually flush MAC tables at the provider edge and refreshes the forwarding tables to the new attachment point for PG1, PT3 607, to the PBB 220 network.

Once the new connection point for PT1*b* at PT3 607 for PG1 has been learned by PT2 608, traffic can be sent from CE2 612 to CE1 602. The data packet between CE2 612 and PE2 610 identifies the source address and the destination address as shown in header 642. In traversing PBT2, additional header information is added to the packet header stack. The original source (SA) CE2 612 and destination (DA) CE1 602 header information is maintained however and backbone source (B-SA) PE2 610 and a backbone destination (B-DA) PT2 608 is added in addition to an PBT2 VID for the PBT route (B-VID) as shown in header 644. When the packet arrives at PT2 608, it now has the appropriate forwarding information for CE1 602 is associated with PG1 and is accessible via PT3 607. The B-DA is replaced with PG1 as shown in header 646, B-SA is changed to the protection group address PG2 associated with PBT2 and B-VID is changed to identify the PBB 220. The packet is then routed onto the PBB 220 and forwarded to PT3 607.

The packet is then received at PT1*b* 607 and is stripped from the PEB sub-network 220. PT1*b* 607 learns, if it is not already aware due to receiving broadcast transactions flooded on the network while it was in hot-standby mode, that CE2 612 is accessible by PG2. As shown in header 648, the B-DA is replaced with PE1 604, the B-SA is replaced with PT3 607 and the B-VID is replaced with the PBT1*b* VID to designate the appropriate path back to PE1 604. PE1 604 receives the packet and forwards it to CE1 602 with the basic header of the original source and destination address as shown in header 650. The traffic routed through the hub and spoke network is tagged with an I-SID on ingress (which is stripped on egress). The I-SID serves to identify the VSS instance of interest and allows traffic to be directed to the appropriate VSI at the PT.

Figure 8:
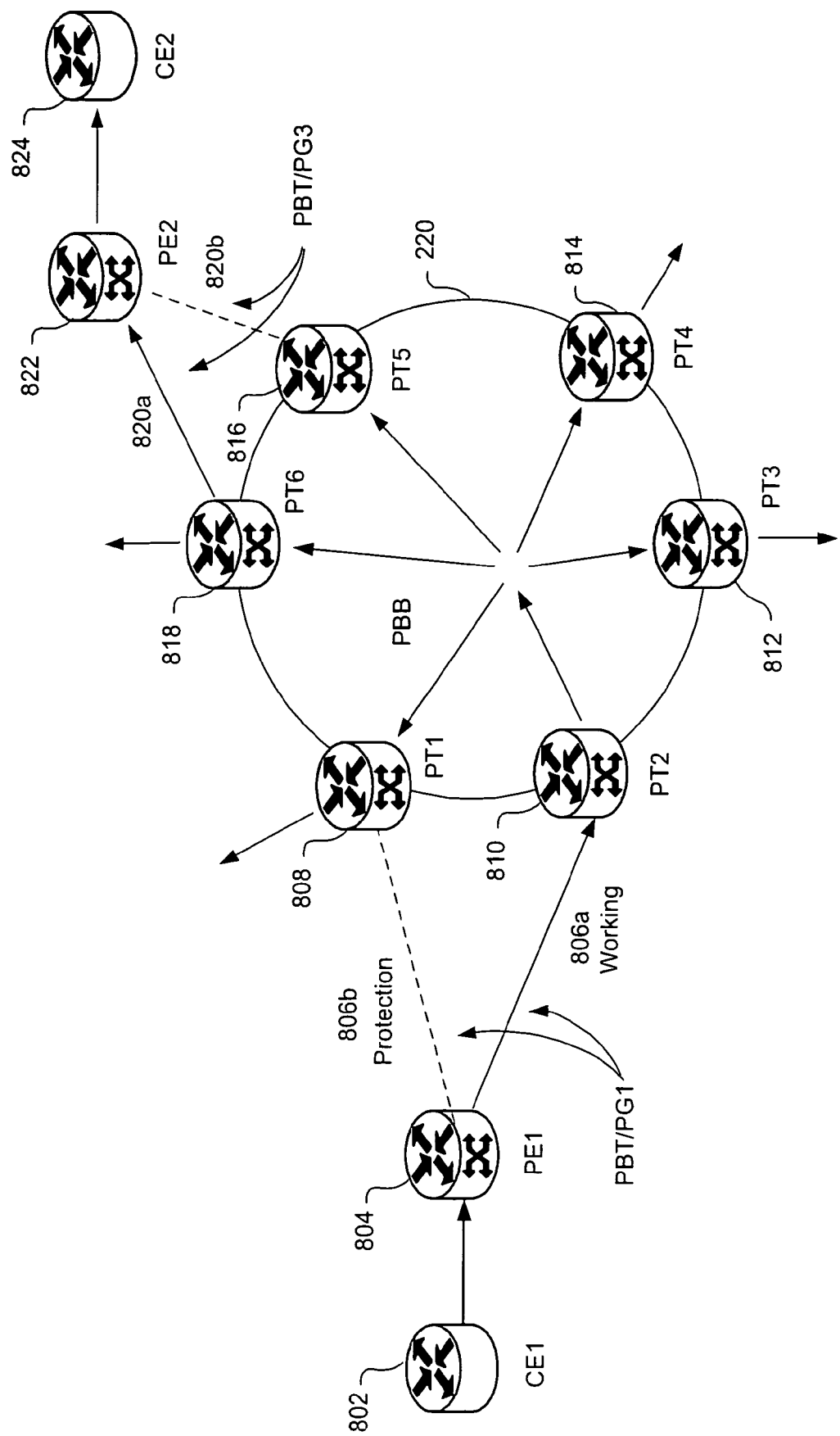
FIG. 8 shows packet walkthrough in a PBT/PBB network when the destination address is unknown according to the present invention.

FIG. 8 shows a packet walkthrough showing multiple PT nodes on the PBB sub-network 220 where a route to the destination CE is unknown. A packet is sent from CE1 802 to CE2 824. PE1 804 encapsulates the packet with the B-VID for the working path PBT 806*a* and forwards the packet via the working PBT link 806*a* to PT2 810. PT2 810 does not known the destination address of CE2 824. The B-DA of the packet received at PT2 810 is replaced with a broadcast B-DA and the B-SA of the packet is changed to a unique MAC address (PG1) associated with the protection group. The B-VID is changed to the PBB VID and the packet is inserted into the PBB domain 220. Each of the provider transport nodes on the broadcast domain identified by the PBB VID in the PBB subnet, PT3 812, PT4 814, PT6 818 and PT1 808 learn the CE1 802 to PG1 binding from the packet header and flood the packets on the working path. In a similar manner by learning from flood messages from other nodes in the network ensures that protection tandems PT1 808 and PT5 816 have accurate forwarding tables for when a protection event occurs. When PT6 818 receives the packet, it learns the CE1 802 and PG1 binding and floods the packet on working paths including PG3 820*a* to PE2 822 and on to CE2 824.

Figure 9:
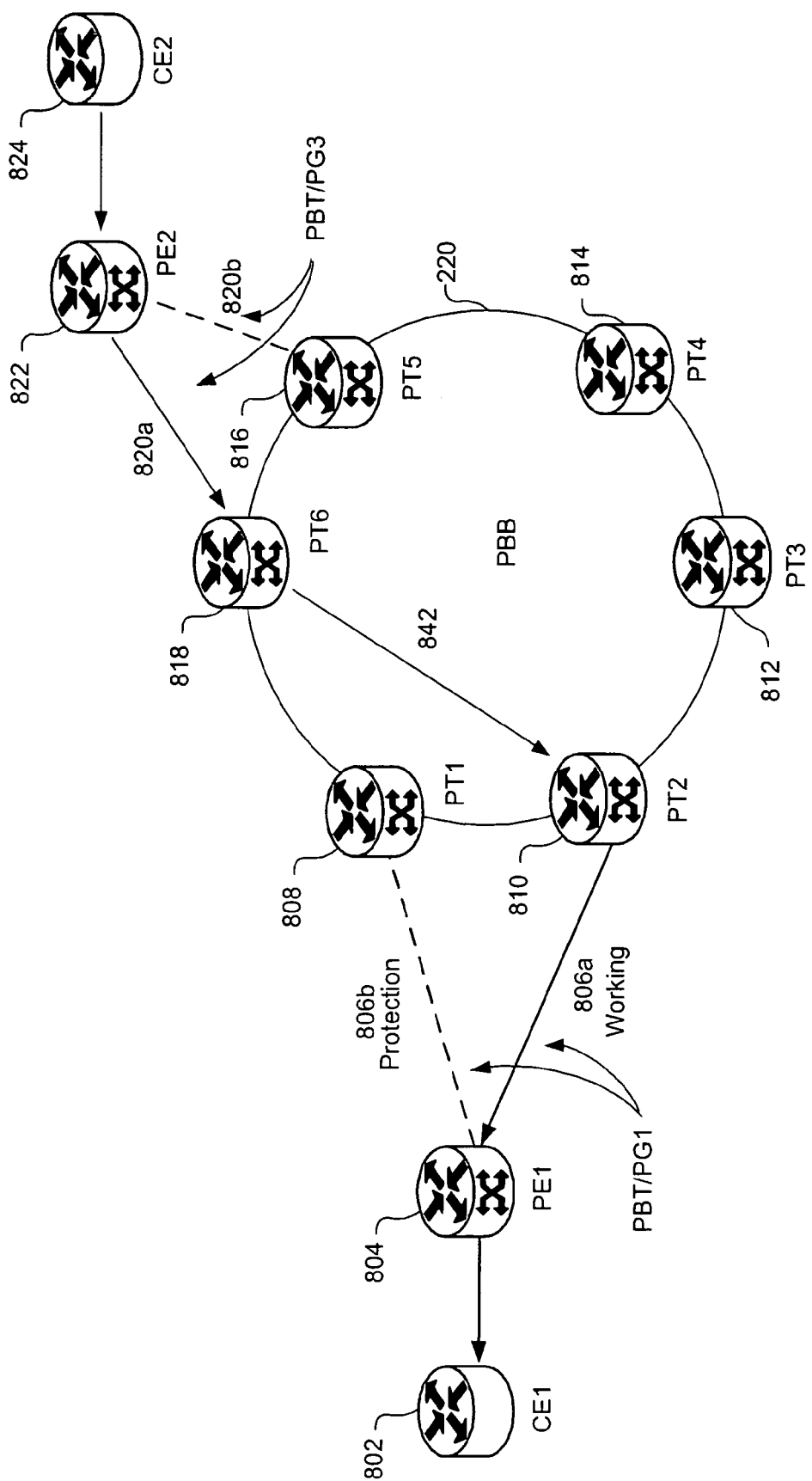
FIG. 9 shows a packet walkthrough in a PBT/PBB network when the destination address is known according to the present invention.

FIG. 9 shows a packet walkthrough with multiple PT nodes on the PBB sub-network 220 where the address of the destination is known. A packet sent from CE2 824 to CE1 802. PE2 822 encapsulates the packet with the B-VID for the working path PBT 820*a* and forwards the packet via the working PBT link 820*a* of protection group PG3 to PT6 818. PT6 818 knows the binding CE1 802 to PG1 currently reachable via PT2 810. The PT6 818 B-DA is replaced with PG1 806*a* destination address. The B-SA is replaced with PG3 address. PT6 818 inserts the packet into the PBB domain 220. PT2 810 then receives the packet, learns of the CE2 824 and PG3 binding. PT2 replaces the B-DA with PE1 804 and the B-SA is replaced with PT2 810 address and the B-VID is replaced with the PBT VID for the working path 806*a*. PT2 then forwards the packet to PE1. At PE1 804, the customer packet is extracted and then sent from PE1 804 and onto the destination CE1 802.

By using PBT protection groups and addressing the PBT by a unique address assigned to the PBT group, traffic can be seamlessly switched between protection groups without requiring tables mapping customer MAC addresses to provider addresses to be flushed in the PBB sub-network. The resiliency of the PBT spokes connected to the PBB hub enables a highly reliably and scalable network. The access points are fully decoupled from the network state and switching is done on the basis of invariant access point addressing.

The embodiments of the invention described above are intended to be illustrative only. The scope of the invention is therefore intended to be limited solely by the scope of the appended claims.

The invention claimed is:

1. An Ethernet services network comprising:
    a distributed switching fabric sub-network comprising a plurality of Provider Tandem (PT) nodes;
    a plurality of Ethernet Provider Backbone Transport (PBT) access sub-network trunks configured as protection groups, each protection group connecting a respective Provider Edge (PE) node to the distributed switching fabric sub-network via a first PBT trunk connected to a first PT node and a second PBT trunk connected to a second PT node, each PE node being connected to at least one respective Customer Edge (CE) node;
    a plurality of virtual hubs overlaid on to the distributed switching fabric sub-network;
    a plurality of virtual spokes overlaid on the protection groups; and
    a plurality of virtual switched sub-networks, each virtual switched sub-network mapped through a respective virtual hub and respective virtual spokes between respective provider edge nodes.

2. The Ethernet service network of claim 1 wherein each of the plurality of virtual switched sub-networks is associated with at least one respective service identifier (I-SIDs).

3. The Ethernet services network of claim 2 wherein each provider tandem node hosts at least one virtual switch instance which switches traffic associated with the at least one service identifier.

4. The Ethernet services network of claim 1, wherein at least one of the PBT trunks of each protection group is a working path and at least one of the PBT trunks of each protection group is a protection path.

5. The Ethernet services network of claim 4 wherein a synchronization protocol between the respective provider edge node and the provider tandem nodes of each protection group is used to determine which of the PBT trunks is the working path.

6. The Ethernet services network of claim 5 wherein the coordination of the protection group is performed by G.8031 protocol for determining which of the PBT trunks is the working path.

7. The Ethernet services network of claim 5 wherein the provider edge node is the unique arbiter of the state of the protection group.

8. The Ethernet services network of claim 4 wherein the protection group is addressed through the distributed switching fabric sub-network by a unique network address associated with the protection group, and packets are forwarded through the distributed switching fabric sub-network to the working path based upon the network address associated with the protection group.

9. The Ethernet services network of claim 4 wherein the protection group is addressed through the distributed switching fabric sub-network by an address associated with the provider edge node, and packets are forwarded through the distributed switching fabric sub-network to the working path based upon the network address associated with the provider edge node.

10. The Ethernet services network of claim 1 wherein the distributed switching fabric sub-network is selected from the group consisting of a provider backbone bridged (PBB) hub compliant with IEEE 802.1ah, a resilient packet ring, MPLS virtual private network configuration (VPLS) and a virtualized layer 2 network.

11. A method of providing Ethernet services in a network, the method comprising the steps of:
providing a distributed switching fabric sub-network comprising at least one Provider Tandem (PT) node;
providing a plurality of Ethernet Provider Backbone Transport (PBT) access sub-network trunks configured as protection groups, each protection group connecting a respective Provider Edge (PE) node to the distributed switching fabric sub-network via a first PBT trunk connected to a first PT node and a second PBT trunk connected to a second PT node, each PE node being connected to at least one respective Customer Edge (CE) node;
overlaying a plurality of virtual hubs on to the distributed switching fabric sub-network;
overlaying a plurality of virtual spokes on the protection groups; and
mapping each of a plurality of virtual switched sub-networks through a respective virtual hub and respective virtual spokes between respective sets of provider edge nodes.

12. The method of claim 11 wherein the provider tandem nodes host virtual switch instances, and wherein packets are associated with the respective virtual switch instances by a service identifier.

13. The method of claim 11 further comprising the step of forwarding packets through the access sub-network trunks based upon an address of the provider edge node and a path identifier.

14. The method of claim 13 wherein the path identifier is a virtual local area network (VLAN) identifier.

15. The method of claim 11 wherein a synchronization protocol between the provider edge node and the provider tandem nodes of a protection group is used to determine which of the PBT trunks of the protection group is a working path.

16. The method of claim 15 wherein the provider edge node is the unique arbiter of the state of the protection group.

17. The method of claim 16 wherein the coordination of the protection group is performed by G.8031 protocol for determining which of the PBT trunks is the working path.

18. A method of configuring Ethernet services in a packet-based network, the method comprising the steps of:
providing a distributed switching fabric sub-network comprising at least one Provider Tandem (PT) node;
providing a plurality of Ethernet Provider Backbone Transport (PBT) access sub-network trunks configured as protection groups, each protection group connecting a respective Provider Edge (PE) node to the distributed switching fabric sub-network via a first PBT trunk connected to a first PT node and a second PBT trunk connected to a second PT node, each PE node being connected to at least one respective Customer Edge (CE) node;
configuring a first path through an access sub-network trunk from a provider edge node to a first provider tandem node of the distributed switching fabric sub-network, wherein the first path is defined by a network address of the first provider tandem node and an identifier associated with the first path; and
configuring the first provider tandem node to route packets of the first path on to the distributed switching fabric sub-network based on a network address associated with a respective CE node of the packet.

19. The method of claim 18 further comprising the steps of:
configuring a second path through an access sub-network trunk for forwarding packets from the provider edge node to a second provider tandem node of the distributed switching fabric sub-network, wherein the second path is defined by a network address of the second provider tandem node and an identifier associated with the second path; and
configuring the second provider tandem node to route packets of the second path on to the distributed switching fabric sub-network based on a network address associated with a respective destination CE node of the packet.

20. The method of claim 19 wherein the first path and second path form a protection group from the provider edge node to the distributed switching fabric sub-network, wherein one of the paths is a working path and the other path is a protection path.

21. The method of claim 20 wherein the first and second provider tandem nodes each provide working and standby virtual switch instances associated with the working path and the protection path.

22. The method of claim 21 further comprising the step of:
configuring a virtual switch sub-network comprising virtual spokes defined by the paths through the access sub-network trunks to paths defined through other access sub-network trunks, the access sub-network trunks being interconnected by the distributed switching fabric sub-network.

23. The method of claim 22 wherein the virtual switch sub-network is identified by an service identifier (I-SID) and routed through associated virtual switch instances (VSI) hosted on the provider tandem nodes.

24. The method of claim 21 further comprising the steps of:
configuring the protection path to operate as the working path when a failure of a communications link in the working path or of the provider tandem node associated with the working path occurs.

25. The method of claim 24 further comprising the steps of:
sending a broadcast message onto the distributed switching fabric sub-network when a protection event occurs, the message identifying as its source a media access control (MAC) address associated with the protection group.

26. The method of claim 25 further comprising the step of:
updating forwarding tables of switching nodes on the distributed switching fabric sub-network to forward traffic to the provider tandem node associated with a new working path.

27. The method of claim 18 wherein the first path through the access sub-network trunk is defined by a combination of a destination network address and a path identifier for port mapping through the access sub-network trunk.

28. A system for packet-based networking, the system comprising:
a distributed switching fabric sub-network comprising at least one Provider Tandem (PT) node;
a plurality of Ethernet Provider Backbone Transport (PBT) access sub-network trunks configured as protection groups connecting a respective Provider Edge (PE) node to the distributed switching fabric sub-network via a first PBT trunk connected to a node and a second PBT trunk connected to a second PT node, each PE node being connected to at least one respective Customer Edge (CE) node;
wherein at least one PT node of the distributed switching fabric sub-network is configured to:
receive a packet through a communication path on an access sub-network trunk, the packet being forwarded through the communication path based on a network address of the PT node and an identifier of the communication path; and
forward the packet through the distributed switching fabric sub-network based on a network address associated with a destination CE node of the packet.

29. The system of claim 28, wherein each trunk of each protection group defines a different path from a respective provider edge node through the access sub-network trunks to diverse provider tandem nodes of the distributed switching fabric sub-network, the protection group comprising a working provider transport trunk and a protection provider transport trunk.

30. The system of claim 29 wherein virtual spokes are overlaid on to a plurality of the access sub-network trunks and virtual hubs are overlaid on to the distributed switching fabric providing a virtual switch sub-network architecture on top of the network physical architecture, wherein a combination of protection switched spokes and a resilient bridge hub sub-network provide resilient loop free Ethernet virtual switch sub-network connectivity.

31. The system of claim 30 wherein each protection group is identified in the distributed switching fabric sub-network by a unique network address associated with the provider edge node, and wherein packets are forwarded through the distributed switching fabric sub-network to the working trunk based upon the network address associated with the provider edge node.

32. The system of claim 30 wherein the protection group is identified in the distributed switching fabric sub-network by the network address assigned to the protection group, and wherein packets are forwarded through the distributed switching fabric sub-network to the working trunk based upon the network address associated with the protection group.

33. The system of claim 28 wherein the path identifier is a VLAN identifier.

34. The system of claim 28 wherein the distributed switching fabric sub-network is selected from the group consisting of a provider backbone bridged (PBB) hub compliant with IEEE 802.1ah, a resilient packet ring, MPLS virtual private network configuration (VPLS) and a virtualized layer 2 network.

* * * * *